United States Patent Office 2,840,606
Patented June 24, 1958

2,840,606

NYLON HYDROLYSIS

Bruce M. Miller, Wilmington, Del., assignor to E. I. du Pont de Nemours and Company, Wilmington, Del., a corporation of Delaware No Drawing. Application April 15, 1955
Serial No. 501,736

9 Claims. (Cl. 260—537)

This invention relates to treatment of nylon waste, particularly for recovery of component difunctional acids and amines.

Conventional manufacture of yarn, film, and other shaped articles from the superpolyamides known generally as "nylon" is not waste-free, varying amounts of product being unusable for one reason or another, such as unsatisfactory color, dimensional variation, or other imperfection in fabrication. Costliness of nylon ingredients indicates the desirability of reprocessing the waste material, even to the extent of chemical recovery, if economically feasible. As applied to the polymeric condensation product of diamines and dibasic acids, described by Carothers in Patents 2,130,523 and 2,130,948, which is the type of nylon of greatest commercial importance, existing recovery methods are based upon hydrolysis of the waste with strong acids or bases and are noted for their complexity and low yields.

A primary object of the present invention is improved isolation and recovery of diamine and diacid constituents of nylon articles. Another object is quantitative separation of these components from one another and from contaminating material. Other objects, together with means and methods for attaining the various objects, will be apparent from the following description of the invention.

In general, the objects of the present invention are accomplished by alkaline hydrolysis of polyamides having diacid and diamine components in presence of an aliphatic alcohol containing at least three carbon atoms in the molecule, whereby the acid component accumulates in an aqueous phase and the amine component in a supernatant alcoholic phase. The invention includes particularly the processing of such nylon waste at temperature of at least 160° C. in the presence of a propyl or butyl alcohol with an aqueous solution of alkali-metal hydroxide in the amount of at least 20% excess equivalents of the acid component to be recovered. Alcohols containing fewer than three carbon atoms fail to give the desired two-phase system; aliphatic alcohols of more than four aliphatic carbon atoms increase the time required for hydrolysis, and those containing more than eight carbon atoms are accordingly of little practical use. This invention further comprehends combination of the indicated hydrolysis of nylon to a two-phase liquid system with separate recovery treatment of each phase to give the amine component by vacuum distillation and the acid component by acidification with strong acid. In the following exemplification of this invention, in which parts are by weight unless otherwise indicated, polyhexamethylene adipamide represents the subject nylons because of its recognized availability and acceptance in the trade.

Example I

In a one-gallon stainless steel autoclave are combined 209 parts isopropanol, 267 parts water, 54 parts 97% sodium hydroxide and 100 parts polyhexamethylene adipamide. Under an atmosphere of nitrogen the charge, totalling 1060 grams, is heated in the autoclave to 180° C., 305 pounds per square inch, for 1½ hours with constant agitation, then cooled. A clear two-phase liquid is drawn off, the upper phase being alcoholic and the lower phase aqueous. The alcoholic phase is decanted off, and the aqueous phase is washed with a small amount of fresh isopropanol. The extract then is combined with the alcoholic phase and is charged to an atmospheric distillation apparatus. Distillation at 86° C. recovers 98% of the isopropyl alcohol as condensate in condition for reuse. The residue is transferred to a vacuum fractionating apparatus operated at pressure equivalent to 30 mm. mercury. The fraction boiling at 105–106° C. (measured at the top of the column) weighs 80.4 grams and is hexamethylene diamine, corresponding to yield of 92.5%. The aqueous phase is acidified with 50% sulfuric acid to pH of 1.0, giving a precipitate of adipic acid weighing 105.3 grams dry, corresponding to 92% yield; purity is established by running a mixed melting point; i. e., by observing the melting point of a mixed sample of this precipitate and pure adipic acid to be 151±1° C.

For comparison, the autoclave used in Example I was charged with a similar mixture omitting the alcohol; the charge, totalling 591 grams, was 39.5 parts sodium hydroxide, 358 parts water, and 100 parts polyhexamethylene adipamide. The whole, under an inert atmosphere, was heated to 180° C. for seven hours with constant agitation, then cooled; the resultant was filtered, leaving 5 grams residue ascertained to be mostly incompletely hydrolyzed polymer. The filtrate was charged to a fractionating apparatus, which removed the water at atmospheric pressure and then the hexamethylene diamine at reduced pressure equivalent to 30 mm. mercury. The yield of hexamethylene diamine was under 82%. The residue of sodium adipate remaining in the distillation apparatus was dissolved in water near the normal boiling temperature, and the solution was acidified with 50% sulfuric acid to pH of 1.0 to precipitate adipic acid; the yield was just under 87%. Distillation was hampered by presence of the solid sodium adipate, which interfered with heat transfer and trapped some diamine.

When ethanol was substituted in the procedure of Example I, with identical amounts of other ingredients used there except that the sodium hydroxide was reduced to 49 parts, the resultant was a single-phase liquid. This was treated as in the paragraph immediately shown; although both completeness and period of hydrolysis were improved, neither the adipic acid nor hexamethylene diamine yield reached 90%. Repetition of this procedure with alkoxy glycols, including ethylene glycol monomethyl ether, gave similar results.

Example II

The ingredients used in Example I, in the same amounts but with the exception of polyhexamethylene sebacamide in place of polyhexamethylene adipamide, are treated in the autoclave at 205° C., autogenous pressure, for 1½ hours with constant agitation. After cooling, the resultant clear two-phase liquid is treated as in Example I, giving a yield of 91% hexamethylene diamine and 92% sebacic acid, determined as above.

Although sodium hydroxide, as exemplified above, is perhaps the most likely hydrolysis agent because of its availability and low cost, other alkali-metal hydroxides may be used satisfactorily. Excess hydroxide should be used to ensure the desired hydrolysis, usually 20% but not more than 100% per equivalents of acid to be recovered. Sufficient water should be used to keep all the diacid salt in solution after completion of the hydrolysis, and it is desirable for the water to make up from 40% to 60% of the total weight of alcohol and water. The reaction mixture may contain up to about 30% nylon waste to be treated.

The temperature to be observed during the hydrolysis should be at least 160° C., preferably 180° C., and may be as high as 220° C. Below 160° C. the hydrolysis does not proceed satisfactorily; undesirable degradation occurs above 220° C. Superatmospheric pressure is essential to the desired temperature but usually will not exceed about 35 atmospheres.

The alcohols included within the preferred range for the purposes of this invention are n-propyl, isopropyl, n-butyl, isobutyl, sec.-butyl, and tert.-butyl. Of these, isopropanol is perhaps the best choice because of solubility and cost characteristics.

The present invention is generally effective upon any hydrolyzable linear condensation polymer of the diamine/dibasic acid type suggested by Carothers as noted above. Any natural animal or vegetable fibers present in the reaction mixture will pass through the recovery process essentially unchanged, so this invention provides a method of recovering nylon ingredients from blended or mixed textiles containing such materials. The nylon ingredients recovered according to this invention are as pure as their commercial counterparts, and they may be reused to reconstruct the polyamide therefrom by any conventional method. For example, polymer made from the diamine and the diacid recovered in Example I proved equivalent to first-grade polyhexamethylene adipamide.

The claimed invention:

1. In alkaline hydrolysis of a polyamide characterized by separation into diacid and diamine components upon alkaline hydrolysis, the improvement comprising adding to the hydrolysis mix an aliphatic alcohol having from three to about eight carbon atoms in the molecule.

2. The process improvement of claim 1 in which the alcohol molecule contains at most four carbon atoms.

3. The process improvement of claim 1 in which the alcohol contains three carbon atoms.

4. The process improvement of claim 3 in which the alcohol is isopropanol.

5. The process of recovering diacid and diamine components of a polyamide characterized by separation into diacid and diamine components upon alkaline hydrolysis, comprising hydrolyzing the polyamide in aqueous alkaline medium at a temperature of at least 160° C. in the presence of aliphatic alcohol having from three to about eight carbon atoms in the molecule, whereby the reaction mixture separates into an aqueous phase in which diacid salt predominates and a supernatant alcoholic phase in which diamine predominates, and separating the phases and obtaining the diamine as residue upon distillation of the alcoholic phase and obtaining the diacid as precipitate upon acidification of the aqueous phase.

6. The process of claim 5 in which the aqueous medium contains in solution a 20% excess, based upon the equivalents of acid to be recovered, of alkali-metal hydroxide.

7. The process of claim 5 in which the alcohol is from the class consisting of propanols and butanols.

8. Process comprising hydrolyzing solid nylon characterized by separation into diacid and diamine components upon alkaline hydrolysis to a two-phase liquid system by treatment of the nylon at a temperature of at least 160° C. with excess aqueous alkali-metal hydroxide and an aliphatic alcohol having at least three but not more than eight carbon atoms in the molecule, whereby the reaction mixture separates into an aqueous phase in which a salt of the dibasic acid accumulates and an alcoholic phase in which the diamine accumulates, and recovering the dibasic acid and diamine separately from the respective phases.

9. The process of claim 5 in which the temperature is within the range of 160–220° C.

References Cited in the file of this patent

UNITED STATES PATENTS

| 2,130,948 | Carothers | Sept. 20, 1938 |
| 2,407,896 | Myers | Sept. 17, 1946 |
| 2,460,040 | Sifferd | Jan. 25, 1949 |

FOREIGN PATENTS

| 443,260 | Italy | Dec. 15, 1948 |

OTHER REFERENCES

Weissberger: Technique of Organic Chemistry, vol. VII, 1955, page 439.